(12) United States Patent
Lu et al.

(10) Patent No.: US 11,015,686 B2
(45) Date of Patent: May 25, 2021

(54) ELECTRIC LINEAR ACTUATOR (71) Applicant: ZHEJIANG JIECANG LINEAR MOTION TECHNOLOGY CO., LTD., Zhejiang (CN)

(72) Inventors: Xiaojian Lu, Zhejiang (CN); Renchang Hu, Zhejiang (CN); Yushan Cheng, Zhejiang (CN); Donghai Wu, Zhejiang (CN)

(73) Assignee: ZHEJIANG JIECANG LINEAR MOTION TECHNOLOGY CO., LTD., Zhejiang (CN)

( * ) Notice: Subject to any disclaimer, the term of this patent is extended or adjusted under 35 U.S.C. 154(b) by 0 days.

(21) Appl. No.: 16/286,597

(22) Filed: Feb. 27, 2019

(65) Prior Publication Data
US 2019/0195323 A1 Jun. 27, 2019

Related U.S. Application Data

(63) Continuation of application No. PCT/CN2016/105224, filed on Nov. 9, 2016.

(30) Foreign Application Priority Data

Aug. 31, 2016 (CN) .......................... 201610794492.5

(51) Int. Cl.
*F16H 25/20* (2006.01)
*F16D 11/04* (2006.01)
(Continued)

(52) U.S. Cl.
CPC ............. *F16H 25/20* (2013.01); *F16D 11/04* (2013.01); *F16D 13/22* (2013.01); *F16D 13/60* (2013.01);
(Continued)

(58) Field of Classification Search
CPC ........ F16H 25/20; F16H 1/16; F16H 57/0025; F16H 2025/209; F16D 11/04; F16D 13/60; F16D 13/22; H02K 7/10; H02K 7/1166
See application file for complete search history.

(56) References Cited

U.S. PATENT DOCUMENTS

2005/0081660 A1* 4/2005 Migliori .................. F16H 25/20
74/25
2005/0160846 A1* 7/2005 Chiang .................... F16H 25/20
74/89.35

(Continued)

FOREIGN PATENT DOCUMENTS

| CN | 2081012 | 7/1991 |
| CN | 2315706 | 4/1999 |

(Continued)

*Primary Examiner* — Zakaria Elahmadi
(74) *Attorney, Agent, or Firm* — JCIPRNET (57) ABSTRACT

The present disclosure discloses an electric linear actuator, comprising: an electric motor, a transmission assembly in transmission connection with the electric motor, and a sleeve assembly in transmission connection with the transmission assembly, wherein the sleeve assembly comprises a main shaft, and a clutch device for implementing power connection or disconnection between the main shaft and the transmission assembly is provided between the main shaft and the transmission assembly, the clutch device comprising a ball clutch. The present disclosure solves the problem of poor smoothness of the existing electric linear actuators upon power connection or disconnection; besides, the present disclosure has a higher transmission efficiency and a longer service life.

9 Claims, 5 Drawing Sheets

(51) Int. Cl.
  *F16D 13/22*  (2006.01)
  *F16D 13/60*  (2006.01)
  *F16H 1/16*  (2006.01)
  *F16H 57/00*  (2012.01)
  *H02K 7/10*  (2006.01)
  *H02K 7/116*  (2006.01)

(52) U.S. Cl.
  CPC ........... *F16H 1/16* (2013.01); *F16H 57/0025* (2013.01); *H02K 7/10* (2013.01); *H02K 7/1166* (2013.01); *F16H 2025/209* (2013.01); *F16H 2025/2071* (2013.01)

(56) References Cited

U.S. PATENT DOCUMENTS

| | | | | |
|---|---|---|---|---|
| 2007/0144279 | A1* | 6/2007 | Wu | H02K 7/06 74/22 A |
| 2011/0061480 | A1* | 3/2011 | Tseng | F16D 11/10 74/89.14 |
| 2015/0376929 | A1* | 12/2015 | Scheuring | F16D 41/064 74/89.38 |
| 2016/0146317 | A1* | 5/2016 | Tseng | F16C 19/545 74/89.37 |

FOREIGN PATENT DOCUMENTS

| | | | | |
|---|---|---|---|---|
| CN | 201651205 | | 11/2010 | |
| CN | 202381584 | | 8/2012 | |
| CN | 202381584 U | * | 8/2012 | ........... F16D 41/064 |
| CN | 206054568 | | 3/2017 | |
| CN | 206145016 | | 5/2017 | |
| EP | 2444695 | | 4/2012 | |

* cited by examiner

ELECTRIC LINEAR ACTUATOR

CROSS-REFERENCE TO RELATED APPLICATION

The present application is a continuation of PCT/CN2016/105224, filed on Nov. 9, 2016, and is related to and claims priority from Chinese patent application No. 201610794492.5 (filed on Aug. 31, 2016). The entire contents of the aforementioned application are hereby incorporated by reference herein.

FIELD OF THE INVENTION

The present disclosure relates to a linear actuating apparatus, and more particularly to an electric linear actuator.

BACKGROUND OF THE INVENTION

An existing electric linear actuator comprises an electric motor, a transmission assembly in transmission connection with the electric motor, and a sleeve assembly in transmission connection with the transmission assembly. The transmission assembly itself is telescopic, such that when the electric motor rotates, the sleeve assembly is driven through the transmission assembly to thereby achieve a telescopic function. However, for the electric linear actuators on the market, the sleeve assembly and the transmission assembly are usually provided with a clutch device for power linkage so as to realize rapid power connection and disconnection between the sleeve assembly and the transmission assembly. However, the prior art has the following problems: the clutch device is relatively complex in structure, the power connection and disconnection are not smooth enough, and the transmission efficiency is not high.

SUMMARY OF THE INVENTION

The present disclosure provides an electric linear actuator to solve the problem of poor smoothness of the existing electric linear actuators during power connection or disconnection.

To solve the above technical problems, the present disclosure adopts the following technical solution:

an electric linear actuator, comprising: an electric motor, a transmission assembly in transmission connection with the electric motor, and a sleeve assembly in transmission connection with the transmission assembly, wherein the sleeve assembly comprises a main shaft, a clutch device for implementing power connection or disconnection between the main shaft and the transmission assembly is provided between the main shaft and the transmission assembly, and the clutch device comprises a ball clutch.

Preferably, the ball clutch comprises: a ball seat connected to the main shaft, and a clutch seat connected to the transmission assembly, wherein a ball is provided on the ball seat, and a limiting groove for positioning the ball is provided on the clutch seat, such that upon power connection, the ball is accommodated in the limiting groove; and upon power disconnection, the ball is disengaged from the limiting groove.

Preferably, a ball groove accommodating the ball is provided on a circumferential side wall of the ball seat, the clutch seat is externally sleeved on the ball seat, an inner convex ring is provided on an inner circumferential wall of the clutch seat, and the limiting groove is provided on the inner convex ring.

Preferably, the ball groove is a wedge-shaped groove within which the ball is movably disposed.

Preferably, the electric linear actuator further comprises a clutch driving assembly for driving the clutch device to be separated or closed.

Preferably, the clutch driving assembly comprises a shifting ring located at an axial side of the clutch seat, wherein when the shifting ring is shifted, the clutch seat is pushed to axially move, thereby causing the limiting groove and the ball to disengage or dock.

Preferably, the clutch driving assembly comprises a shifting ring seat on which the shifting ring is rotatably connected, the shifting ring having a pull bar which, when being forced, drives the shifting ring to rotate; and when the shifting ring rotates, the clutch seat is pushed to move.

Preferably, the electrical push driver further comprises a brake seat within which a sliding block is slidably connected, one end of the sliding block being connected with the pull bar, and the other end thereof being connected with a brake cable.

Preferably, the transmission assembly comprises a worm connected to the electric motor, the worm is engaged with a worm wheel that is in transmission connection with a transmit key, and a transmit key groove matching the transmit key is provided on the clutch seat.

Preferably, the sleeve assembly comprises an inner tube and an outer tube, the main shaft is a screw rod on which a nut is connected, the nut being secured with the inner tube, and when the main shaft rotates, the inner tube and the outer tube are driven to move relative to each other.

The present disclosure has the following benefits:

In the present disclosure, the clutch device between the main shaft and the transmission assembly is a ball clutch. The ball clutch is characterized in that power connection and disconnection are implemented by rolling of the ball; compared with the traditional teeth-docking clutch mode, teeth-collision and teeth-stuck problems can be effectively reduced. Moreover, the power connection is smoother, and the service life is longer. From the perspective of the entire electric linear actuator, the sleeve assembly will not generate a relatively large impact upon power connection or power disconnection, such that the sleeve assembly becomes more stable when being stretched or retracted.

In addition, as a preferred solution, the ball in the ball clutch of the present disclosure also has a self-regulation function, such that the clutch can perform a clutch function of quick releasing either when the electric linear actuator operates normally or the electric motor of the electric linear actuator does not run, i.e., when disconnection is needed, quick cutoff of the power can be achieved, while when connection is needed, quick connection can be achieved, resulting in a nearly seamless docking and a quick response speed.

The above characteristics and advantages of the present disclosure will be disclosed in detail in the following preferred embodiments and the drawings.

BRIEF DESCRIPTION OF THE ACCOMPANYING DRAWINGS

Hereinafter, the present disclosure will be further illustrated with reference to the accompanying drawings.

DETAILED DESCRIPTION OF THE PREFERRED EMBODIMENTS

Hereinafter, the technical solutions of the examples of the present disclosure will be explained and illustrated in conjunction with the drawings of the examples of the present disclosure. However, the examples below are only preferred examples of the present disclosure, not all of them. Based on the examples in the embodiments, other examples, which may be obtained by those skilled in the art without exercise of inventive work, fall into the protection scope of the present disclosure.

Figure 1:
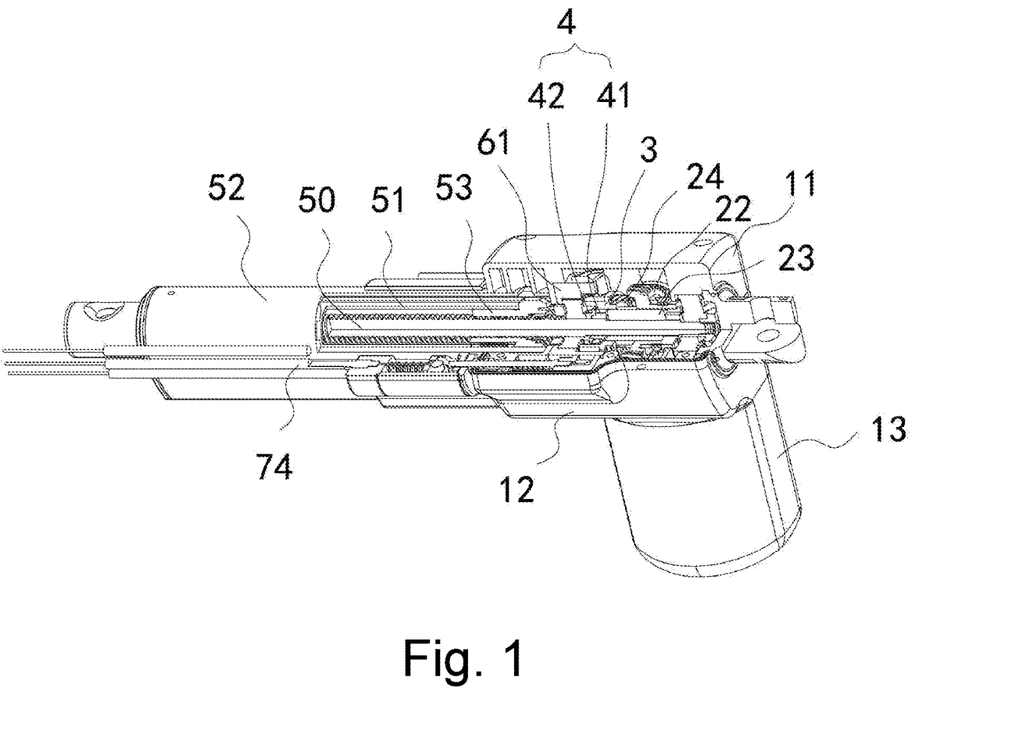
FIG. 1 is a schematic local sectional view of Example 1 of the present disclosure.

To facilitate the description below, the expressions "left," "right," "up," and "down" appearing below are all defined with reference to the orientations shown in FIG. 1.

Example 1

Figure 2:
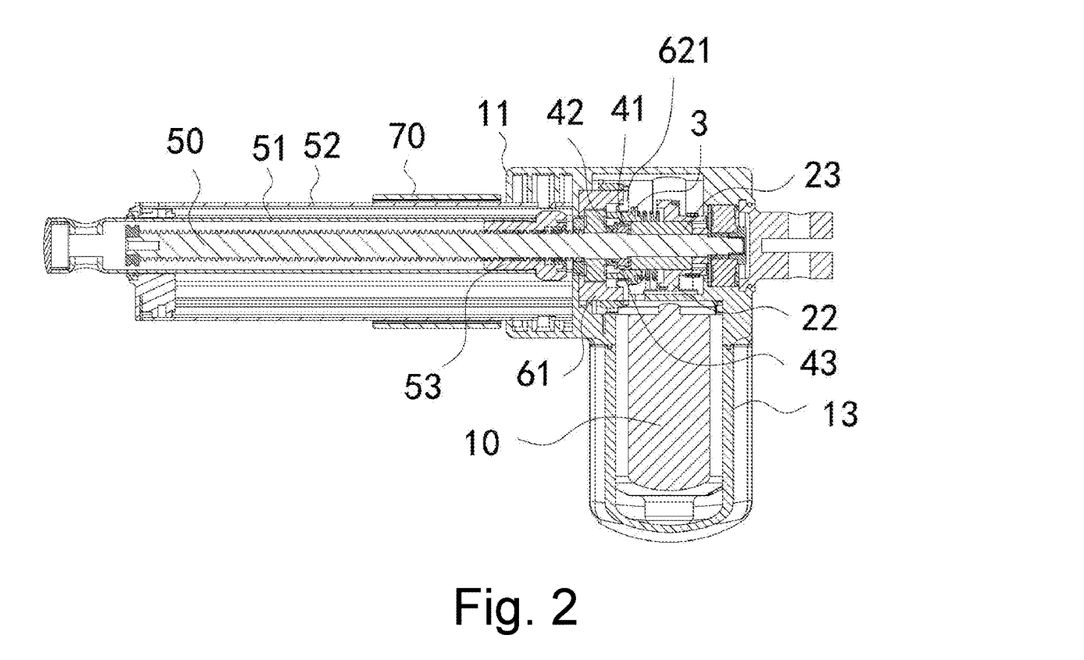
FIG. 2 is a schematic semi-sectional view of Example 1 of the present disclosure.

This example relates to an electric linear actuator mainly applied to medical devices and furniture products. As an electric part functioning to elevate, it is applied to elevate medical beds or elevate desks and chairs, etc. As shown in FIG. 1 and FIG. 2, the present example comprises an electric motor 10, a transmission assembly in transmission connection with the electric motor 10, and a sleeve assembly in transmission connection with the transmission assembly, wherein the transmission assembly is mounted in a housing; the housing of this example includes an upper housing 11 and a lower housing 12; a motor hood 13 is provided outside of the electric motor 10; the electric motor hood 13 and the lower housing 12 are securely mounted. During operation, the electric motor 10 rotates; when the electric motor 10 rotates, power is transmitted to the sleeve assembly through the transmission assembly; the sleeve assembly implements a telescopic function; one end of the sleeve assembly is secured with an elevated object, thereby implementing an elevating function of the object.

Figure 8:
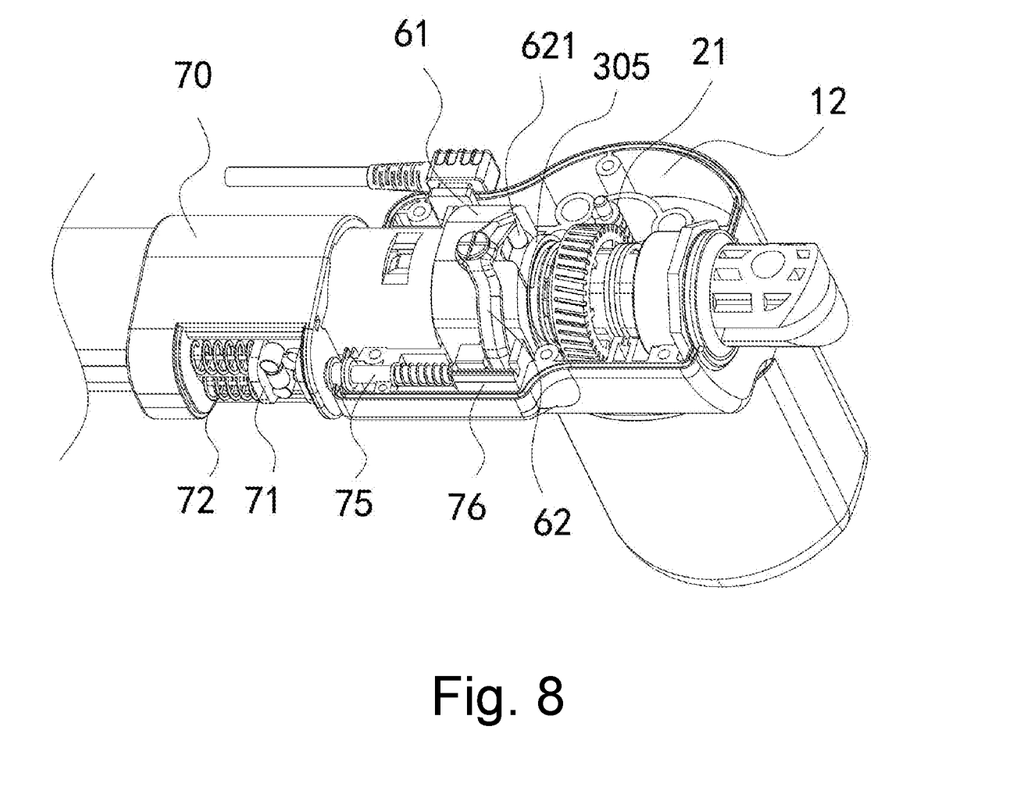
FIG. 8 is a structural diagram after removing an upper housing and a housing shell in Example 1 of the present disclosure.

As shown in FIGS. 1-4, specifically, the transmission assembly in this example comprises: a worm 21 (shown in FIG. 8) provided on an output axis of the electric motor 10, an axial direction of the worm 21 being a vertical direction; the worm 21 is in transmission engagement with a worm wheel 22, an axial direction of the worm wheel 22 being a left-right horizontal direction; an axial center of the worm wheel 22 is provided with a worm wheel central hole; a transmission sleeve is provided in the worm wheel central hole; a transmit key is provided at an outer circumferential wall of the transmission sleeve; a transmit key groove matching the transmit key is provided on the worm wheel central hole; and upon rotation, the worm wheel 22 drives the transmit key to rotate, thereby driving the transmission sleeve to rotate. In this example, the transmit key and the transmission sleeve are of an integral structure, generally forming a spline sleeve 23, such that the transmit key groove on the worm wheel central hole in this example is a spline groove 221.

When working normally, the electric motor 10 rotates, driving the worm 21 to rotate; rotation of the worm 21 drives the worm wheel 22 to rotate; rotation of the worm wheel 22 drives the spline sleeve 23 to rotate.

Figure 3:
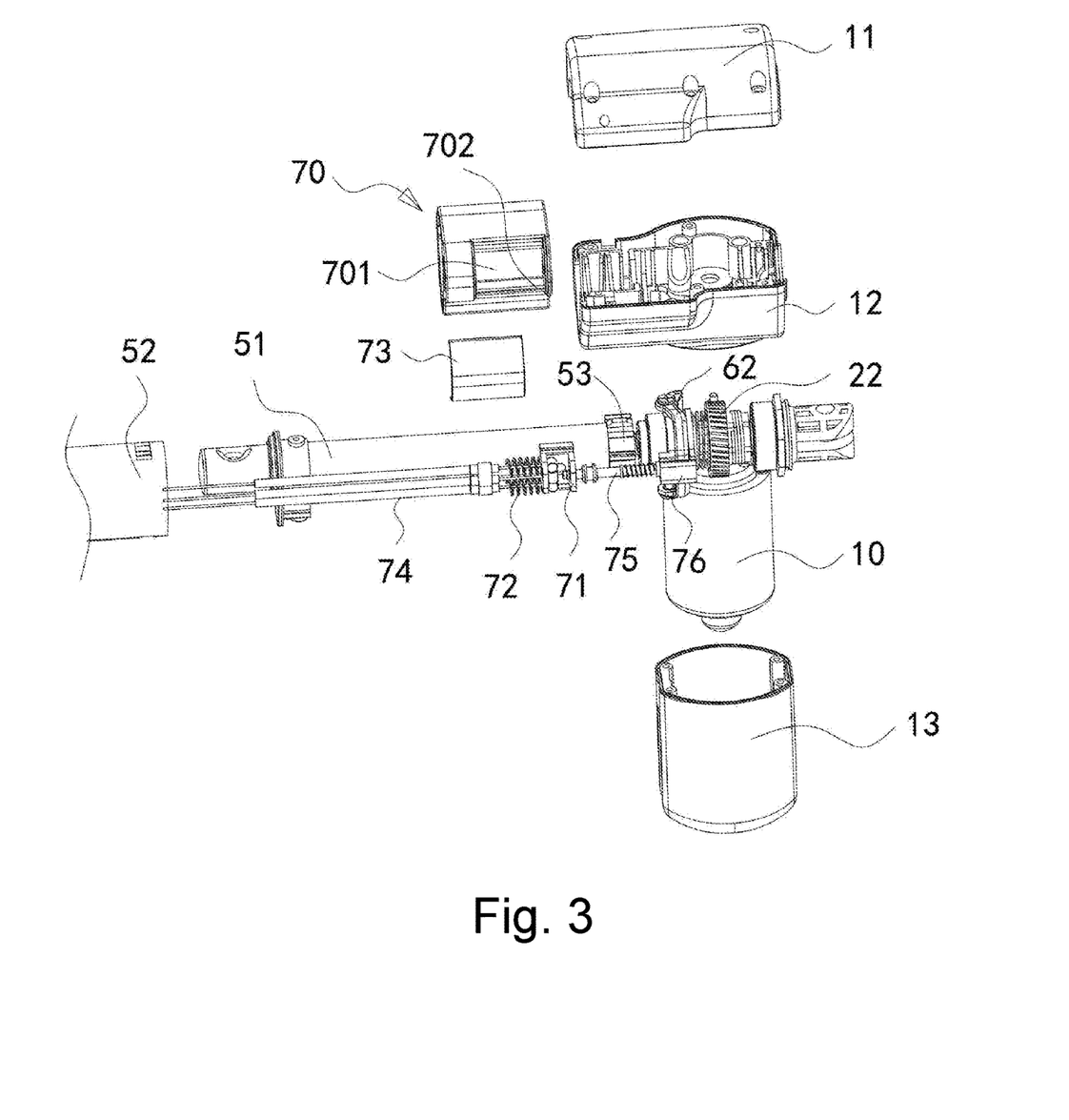
FIG. 3 is an exploded view of Example 1 of the present disclosure.

The sleeve assembly in this example comprises: an inner tube 51 and an outer tube 52, the outer tube 52 being sleeved outside of the inner tube 51, and a main shaft is disposed in the inner tube 51; the main shaft of this example is a screw rod 50 on which a nut 53 is connected, the nut 53 being secured to the inner tube 51; upon rotation of the screw rod 50, the nut 53 and the screw rod 50 have an axial displacement, such that the nut 53 drives the inner tube 51 to have an axial displacement relative to the screw rod 50; the axial positions of the outer tube 52 and the screw rod 50 are relatively fixed, finally causing the inner tube 51 and the outer tube 52 to move relatively.

In this example, a clutch device for implementing power connection or disconnection between the main shaft and the transmission assembly is provided between the main shaft and the transmission assembly. Specifically, a clutch device is provided between the screw rod 50 and the spline sleeve 23. In this example, the clutch device comprises a ball clutch.

A specific structure of the ball clutch comprises: a clutch seat 3 and a ball seat 4, wherein the ball seat 4 is connected with the screw rod 50. The structure of the ball seat 4 refers to FIGS. 4 and 6. Specifically, a center of the ball seat 4 is provided with a flat shaft hole 401, one segment of the screw rod 50 is a flat shaft with a shape matching the flat shaft hole 401, the flat shaft penetrating through the flat shaft hole 401, and the screw rod 50 and the ball seat 4 are fixedly connected. In this example, the fixed connection in this example is implemented by interference fitting between the flat shaft and the flat shaft hole 401, such that when the ball seat 4 rotates, the screw rod 50 is driven to rotate. The cross-section shape of the flat shaft hole 401 in this example is not limited to the shape shown in FIGS. 4-6, which is only required to be a non-circular hole.

Figure 4:
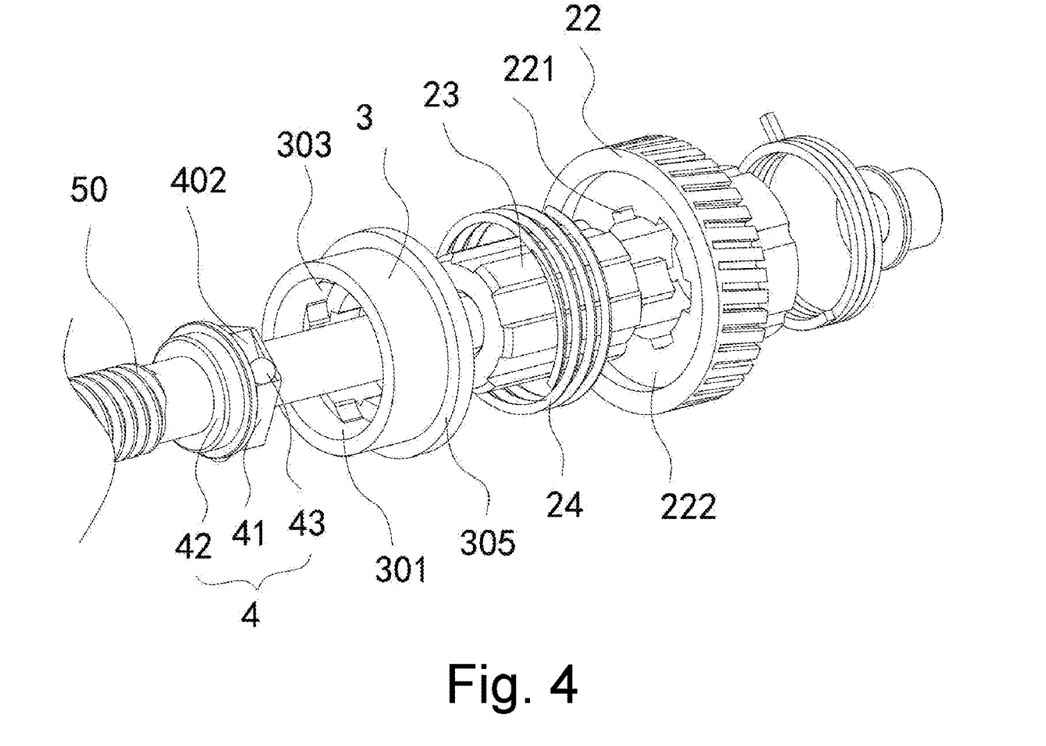
FIG. 4 is an exploded view of Example 1 of the present disclosure at a clutch device.
Figure 6:
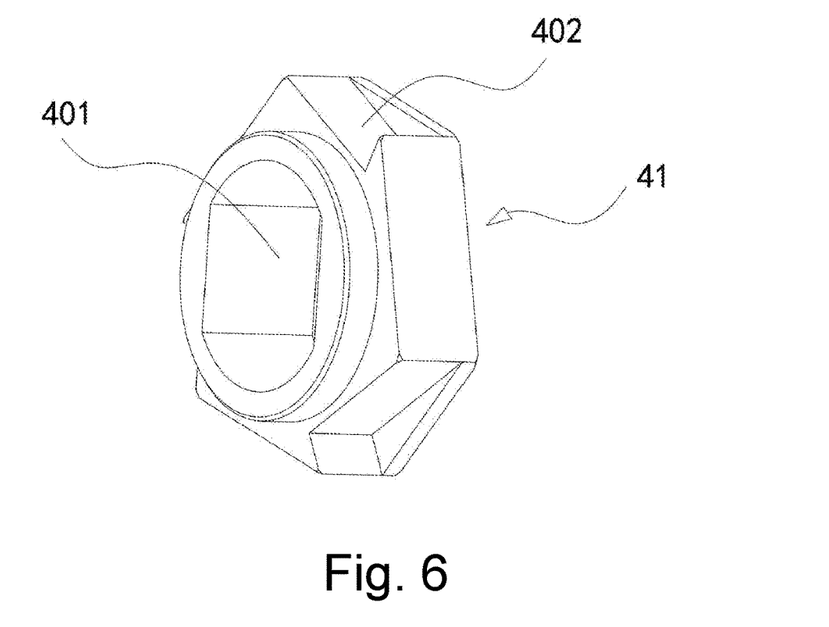
FIG. 6 is a structural diagram of a ball seat in Example 1 of the present disclosure.

Three ball grooves 402 are disposed circumferentially on an outer circumferential side wall of the ball seat 4 at intervals. In this example, the three ball grooves 402 are preferably distributed with even intervals, and a ball 43 is accommodated in each ball groove 402. The three ball grooves 402 can reach a minimal number of circumferential balance. Of course, those skilled in the art should know that other examples are not limited by this number.

Figure 5:
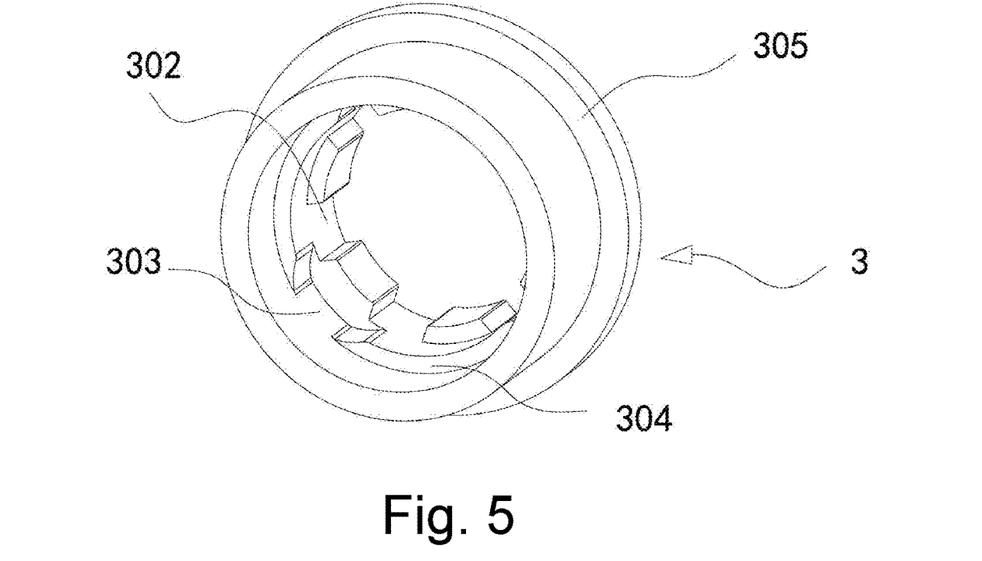
FIG. 5 is a structural diagram of a clutch seat in Example 1 of the present disclosure.

The clutch seat 3 is connected with the spline sleeve 23, a center of the clutch seat 3 is provided with a clutch seat inner hole 301, a right end of the clutch seat inner hole 301 is provided with a coupling key groove 302 with a shape matching the spline sleeve 23, i.e., when the spline sleeve 23 rotates, the clutch seat 3 is driven to rotate. Besides the coupling key groove 302, a limiting groove 303 for positioning the ball 43 is also provided on the clutch seat inner hole 301.

Upon power connection, the ball 43 is accommodated within the limiting groove 303, i.e., when the clutch seat 3 rotates, a groove wall of the limiting groove 303 abuts against the ball 43; after the abutting, the ball 43 cannot make a circumferential free rotation within the clutch seat inner hole 301; at this point, the ball 43 rotates with the clutch seat 3; when the ball 43 rotates, the ball seat 4 is driven to rotate, thereby causing the ball seat 4 and the clutch seat 3 to rotate synchronously, and finally driving the screw rod 50 to rotate synchronously;

Upon power disconnection, i.e., when the clutch seat 3 moves axially to the right side, the ball 43 is disengaged from the limiting groove 303; at this point, the groove wall of the limiting groove 303 cannot contact the ball 43, and an action force between the limiting groove 303 and the ball 43 is lost; as a result, the ball 43 may rotate circumferentially freely within the clutch seat inner hole 301, and the clutch seat 3 is in an idling state. At this point, the screw rod 50 has no power feed and does not rotate.

FIG. 5 shows a specific structure of the clutch seat 3: an inner convex ring 304 is provided on an inner circumferential wall of the clutch seat inner hole 301, and the limiting groove 303 is provided on the inner convex ring 304; this example provides three limiting grooves 303 along a circumference of the inner convex ring 304 at even intervals, while the coupling key groove 302 is exactly disposed at the right side of the inner convex ring 304, available for axially limiting the ball.

Further preferably, the ball groove 402 in this example is a wedge-shaped groove, the wedge-shaped groove being formed by inward recession of the outer side wall of the ball seat 4; a length direction of the wedge-shaped groove is a tangent direction of the ball seat 4, a circumferential length of the ball groove 402 is greater than a diameter of the ball 43, and the circumferential length of the limiting groove 303 is also greater than the diameter of the ball 43. The ball 43 is movably disposed in the ball groove 402, i.e., the ball 43 has a radial and circumferential moving space in the ball groove 402, the radial and circumferential moving space being relative to an axial center of the ball seat 4. Such a design has an advantage that the distance between the ball 43 and the center of the ball seat 4 is movably adjustable, and due to the characteristic of the wedge-shaped groove, the adjustable effect is automatically adjusted.

Specifically:

When the ball seat 4 is just docked with the clutch seat 3 and the ball seat 4 just starts to rotate, under the action of centrifugal force, the ball 43 will be automatically thrown to a farthest distance from the center of the ball seat 4, i.e., the utmost outer end of the wedge-shaped groove; at this point, the spacing between the ball 43 and the center of the ball seat 4 is the largest; at this position state, the contact area between the ball 43 and the groove wall of the limiting groove 303 is the largest, with a good and tight engagement;

When the ball seat 4 is in a non-rotating state, the ball 43 will not be subjected to the action of centrifugal force. At this point, the ball 43 under its self-weight will automatically slip to a position closest to the center of the ball seat 4 along a bevel surface of the wedge-shaped groove, i.e., the utmost inner end of the wedge-shaped groove; at this point, the spacing between the ball 43 and the center of the ball seat 4 is the smallest. In this position state, the contact area between the ball 43 and the limiting groove 303 is the smallest, which greatly facilitates docking between the ball seat 4 and the clutch seat 3, i.e., automatically preparing for docking using the automatic adjustment function of the wedge-shaped groove, such that the clutch seat 3 and the ball seat 4 smoothly enter a connection state from the disconnection state.

With this preferred solution, using the self-adjustment function of the ball, the clutch can implement a clutch role of quick releasing either when the electric linear actuator runs normally or when the electric motor of the electric linear actuator does not run, i.e., when it is needed to disconnect, fast power cutoff can be achieved, and when it is needed to connect, quick connection can be achieved, resulting in a seamless docking and a quick response speed.

In this example, considering processing difficulties, the ball seat 4 adopts an approach of separate processing and splicing, i.e., the ball seat 4 comprises a ball seat body 41 and a ball seat stopper ring 42; firstly, an open ball groove is processed out on the ball seat body 41; then a ball seat stopper ring 42 is spliced at an end face of the ball seat body 41; the end face of the ball seat stopper ring 42 is used as one side wall of the open ball groove, thereby forming an integral ball groove 402. Such a structure reduces the processing difficulty and lowers the cost. Of course, those skilled in the art should know that the ball seat 4 may also be an integral structure.

What has been described in detail is mainly the ball clutch in this example. The ball clutch in this example has an advantage that the structure is relatively simple with fewer spare parts; thus, the cost is low and the size is relatively small; in addition, with the rolling characteristic of the ball, upon power connection or power disconnection, the smoothness is good; moreover, due to the rolling characteristic of the ball, upon power connection, the abrasion between the clutch seat 3 and the ball seat 4 is very small, which greatly increases the service life; most crucially, the ball in this example has a self-regulation role; during the clutch process, quick connection and quick disconnection can be implemented with a fast response speed.

Additionally, in this example, the electric linear actuator also comprises a clutch driving assembly for driving the ball clutch to separate or close, specifically a clutch drive assembly that drives the clutch seat 3 to axially move.

Figure 7:
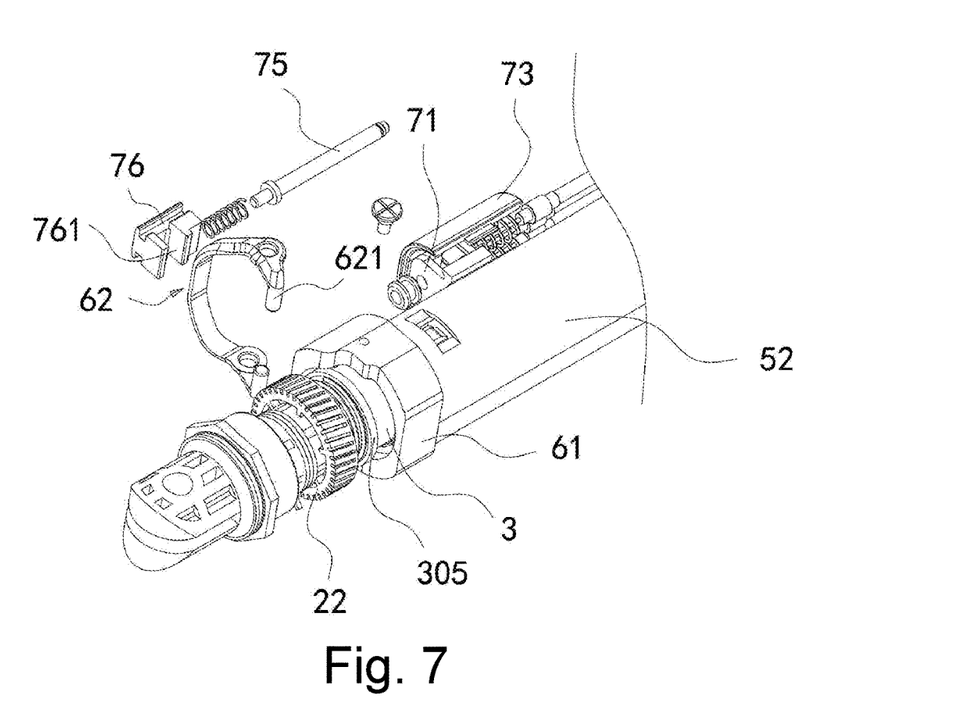
FIG. 7 is an assembly diagram of a clutch driving assembly in Example 1 of the present disclosure.

FIGS. 2 and 7 show a specific structure of the clutch driving assembly, comprising: a shifting ring seat 61 disposed at an outer circumference of the clutch seat 3, the shifting ring 61 itself being fixed to the upper housing 11 or the lower housing 12; a center of the shifting ring 61 is provided with a shifting ring inner cavity in which the clutch seat 3 is disposed; a shifting ring 62 is rotatably connected on the shifting ring seat 61; the shifting ring 62 is a U-shaped element; two side wings of the shifting ring 62 are rotatably connected on the shifting ring seat 61; end portions of the two side wings of the shifting ring 62 extend inwardly to form shifting bars 621; outer convex rings 305 radially extending outwardly are provided on the outer circumference of the clutch seat 3 in this example; two shifting bars 621 on the shifting ring 62 are close to the outer circumference of the clutch seat 3 and disposed to the left side of the outer convex ring 305;

A first reset spring 24 is provided between a right end face of the clutch seat 3 and a left end face of the worm wheel 22, wherein a spring groove 222 for positioning the first reset spring 24 is provided on the left end face of the worm wheel 22; when working normally, the first reset spring 24 is in an uncompressed state;

A brake seat 70 is fixedly mounted on an outer wall of the outer tube 52, a sliding inner cavity 701 is provided in the brake seat 70, and a sliding rail 702 is provided on the sliding inner cavity 701; a sliding block 71 is slidably connected on the sliding rail 702, the sliding direction of the sliding block 71 being parallel to the axial direction of the outer tube 52; a second reset spring 72 is provided between a left side end of the sliding block 71 and a left side wall of the sliding inner cavity 701; a housing cover 73 is mounted outside of the sliding inner cavity 701; a left end of the sliding block 71 is connected with a brake cable 74, and a right end of the sliding block 71 is connected with a pull bar 75, a right end of the pull bar 75 being secured with a connection block 76; the upper housing 11 and the lower housing 12 are provided thereon with a sliding passage for the connection block 76 to slide; a lock groove 761 is provided on the connection block 76, one end of the shifting ring 62 distal from the shifting bar 621 being snap-fitted in the lock groove 761.

When the brake cable 74 is pulled towards the left side, the sliding block 71 moves correspondingly to the left side from the original position; at this point, the pull bar 75 is driven to move to the left side; when the pull bar 75 is moving to the left side, the connection block 76 correspondingly moves to the left; at this point, the connection block 76 shifts the shifting ring 62 to rotate using the lock groove 761; when the shifting ring 62 rotates, the shifting bar 621 on the shifting ring 62 abuts against the outer convex ring 305 on the clutch seat 3 to push the clutch seat 3 to move to the right side; when the first reset spring 24 is compressed and the clutch seat 3 moves to the right side, the ball 43 on the ball seat 4 is disengaged from the limiting groove 303 on the clutch seat 3, thereby implementing power disconnection; and when the brake cable 74 is released, with the resilient action of the first reset spring 24, the clutch seat 3 is subjected to a leftward push force from the first reset spring 24, re-implementing the power connection between the clutch seat 3 and the ball seat 4, while the sliding block 71 also returns to the original position under the action of the second reset spring 72.

An advantage of the clutch driving assembly in this example is that: upon release, the shifting ring 62 is rotary, and the frictional force between the shifting bar 621 and the outer convex ring 305 is small, thereby achieving an advantage of small release force and high efficiency; moreover, it is enabled to timely release when the load force of the electric linear actuator is large and stop at any time in the midway; in cooperation with the self-adjustable ball clutch, even when the electric motor does not rotate, power connection or disconnection may still be implemented.

Example 2

This example differs from Example 1 in that the ball clutch in this example has a different structure. For the ball clutch in this example, the ball groove in this example is only for limiting the ball at a fixed position on the side wall of the ball seat, i.e., the circumferential position of the ball on the ball seat is fixed, and the ball can only perform rolling at the fixed position. Similar to a sliding bearing, upon power connection, when the clutch seat rotates circumferentially and the limiting groove on the clutch seat rotates to correspond to the ball position, the ball is caught in the limiting groove so as to achieve docking; this example has an advantage that the ball seat may directly employ a ball-type sliding bearing, which is easy to purchase, and the cost is reduced.

Example 3

This example differs from Example 1 in that the ball clutch in this example has a different structure. For the ball clutch in this example, its ball groove is not a wedge-shaped groove, but a semi-circular groove or a triangular groove. Such a structure has an advantage that the ball may be thrown to the utmost outer end of the ball groove regardless of whether the electric motor rotates clockwise or counterclockwise, i.e., no matter whether the electric rotates clockwise or counterclockwise, the clutching effect of this example is very smooth and stable.

What have been mentioned above are only preferred embodiments of the present disclosure. However, the protection scope of the present disclosure is not limited thereto. Any technician familiar with this field should understand that the present disclosure includes, but not limited to, the contents described in the drawings and the preferred embodiments. Any modifications to the functions, structures, and principles of the present disclosure without departing from the present disclosure will be included within the scope of the claims.

What is claimed is:

1. An electric linear actuator, comprising: an electric motor, a transmission assembly in transmission connection with the electric motor, and a sleeve assembly in transmission connection with the transmission assembly, wherein the sleeve assembly comprises a main shaft, a clutch device for implementing power connection or disconnection between the main shaft and the transmission assembly is provided between the main shaft and the transmission assembly, and the clutch device comprises a ball clutch, wherein the ball clutch comprises: a ball seat connected to the main shaft, and a clutch seat connected to the transmission assembly, wherein a ball is provided on the ball seat, and a limiting groove for positioning the ball is provided on the clutch seat, such that upon power connection, the ball is accommodated in the limiting groove; and upon power disconnection, the ball is disengaged from the limiting groove, the electric linear actuator further comprising a clutch driving assembly for driving the clutch device to be separated or closed, wherein the clutch driving assembly comprises:

a shifting ring located at an axial side of the clutch seat, and when the shifting ring is shifted, the clutch seat is pushed to axially move, thereby causing the limiting groove and the ball to disengage or dock; and a shifting ring seat on which the shifting ring is rotatably connected, the shifting ring having a pull bar which, when being forced, drives the shifting ring to rotate; and when the shifting ring rotates, the clutch seat is pushed to move;

the electric linear actuator further comprising a brake seat within which a sliding block is slidably connected, one end of the sliding block being connected with the pull bar, and the other end thereof being connected with a brake cable.

2. The electric linear actuator according to claim 1, characterized in that a ball groove accommodating the ball is provided on a circumferential side wall of the ball seat, the clutch seat is externally sleeved on the ball seat, an inner convex ring is provided on an inner circumferential wall of the clutch seat, and the limiting groove is provided on the inner convex ring.

3. The electric linear actuator according to claim 2, characterized in that the ball groove is a wedge-shaped groove within which the ball is movably disposed.

4. The electric linear actuator according to claim 1, characterized in that the transmission assembly comprises a worm connected to the electric motor, the worm is engaged with a worm wheel that is in transmission connection with a transmit key, and a transmit key groove matching the transmit key is provided on the clutch seat.

5. The electric linear actuator according to claim 1, characterized in that the sleeve assembly comprises an inner tube and an outer tube, the main shaft is a screw rod on which a nut is connected, the nut being secured with the inner tube, and when the main shaft rotates, the inner tube and the outer tube are driven to move relative to each other.

6. The electric linear actuator according to claim 2, characterized in that the transmission assembly comprises a worm connected to the electric motor, the worm is engaged with a worm wheel that is in transmission connection with a transmit key, and a transmit key groove matching the transmit key is provided on the clutch seat.

7. The electric linear actuator according to claim 3, characterized in that the transmission assembly comprises a worm connected to the electric motor, the worm is engaged with a worm wheel that is in transmission connection with a transmit key, and a transmit key groove matching the transmit key is provided on the clutch seat.

8. The electric linear actuator according to claim 2, characterized in that the sleeve assembly comprises an inner tube and an outer tube, the main shaft is a screw rod on which a nut is connected, the nut being secured with the inner tube, and when the main shaft rotates, the inner tube and the outer tube are driven to move relative to each other.

9. The electric linear actuator according to claim 3, characterized in that the sleeve assembly comprises an inner tube and an outer tube, the main shaft is a screw rod on which a nut is connected, the nut being secured with the inner tube, and when the main shaft rotates, the inner tube and the outer tube are driven to move relative to each other.

\* \* \* \* \*